United States Patent

Kowalski et al.

[11] Patent Number: 5,825,882
[45] Date of Patent: Oct. 20, 1998

[54] ENCRYPTION AND AUTHENTICATION METHOD AND CIRCUIT FOR SYNCHRONOUS SMART CARD

[75] Inventors: Jacek Kowalski, Trets; Michel Martin, Marsielle; Jacques Stern, Paris; Antoine Joux, Thorigne-Fouillard, all of France

[73] Assignee: Gemplus Card International, Gemenos, France

[21] Appl. No.: 446,644

[22] PCT Filed: Nov. 19, 1993

[86] PCT No.: PCT/FR93/01140

§ 371 Date: Jul. 31, 1995

§ 102(e) Date: Jul. 31, 1995

[87] PCT Pub. No.: WO94/11829

PCT Pub. Date: May 26, 1994

[30] Foreign Application Priority Data

Nov. 19, 1992 [FR] France ................................. 92 13913

[51] Int. Cl.⁶ ....................................................... H04L 9/00
[52] U.S. Cl. .................... 380/25; 380/9; 380/23; 380/28; 380/49; 380/50; 235/380
[58] Field of Search ................................ 380/4, 9, 28, 30, 380/46, 49, 50, 23, 25; 235/380, 24, 379

[56] References Cited

U.S. PATENT DOCUMENTS 4,064,558  12/1977  Hughes et al. ...................... 380/50 X
4,087,626   5/1978  Brader ................................. 380/46 X

FOREIGN PATENT DOCUMENTS

A-0154252  9/1985  European Pat. Off. .
A-0472939  3/1992  European Pat. Off. .

*Primary Examiner*—Bernarr E. Gregory
*Attorney, Agent, or Firm*—Nilles & Nilles SC

[57] ABSTRACT

Encryption circuits and methods, in particular for smart cards, are disclosed. Smart cards without microprocessors may be authenticated very simply by using encryption with a secret card data table on which recursive cycles are executed. During each cycle, a word is read out of the table, said word being at an address that is at least partially defined by the word read out in the previous cycle. The new address preferably consists of several bits from the previous word and a bit from internal card data, external data supplied by a card reader, or a register containing a partial encryption result.

27 Claims, 3 Drawing Sheets

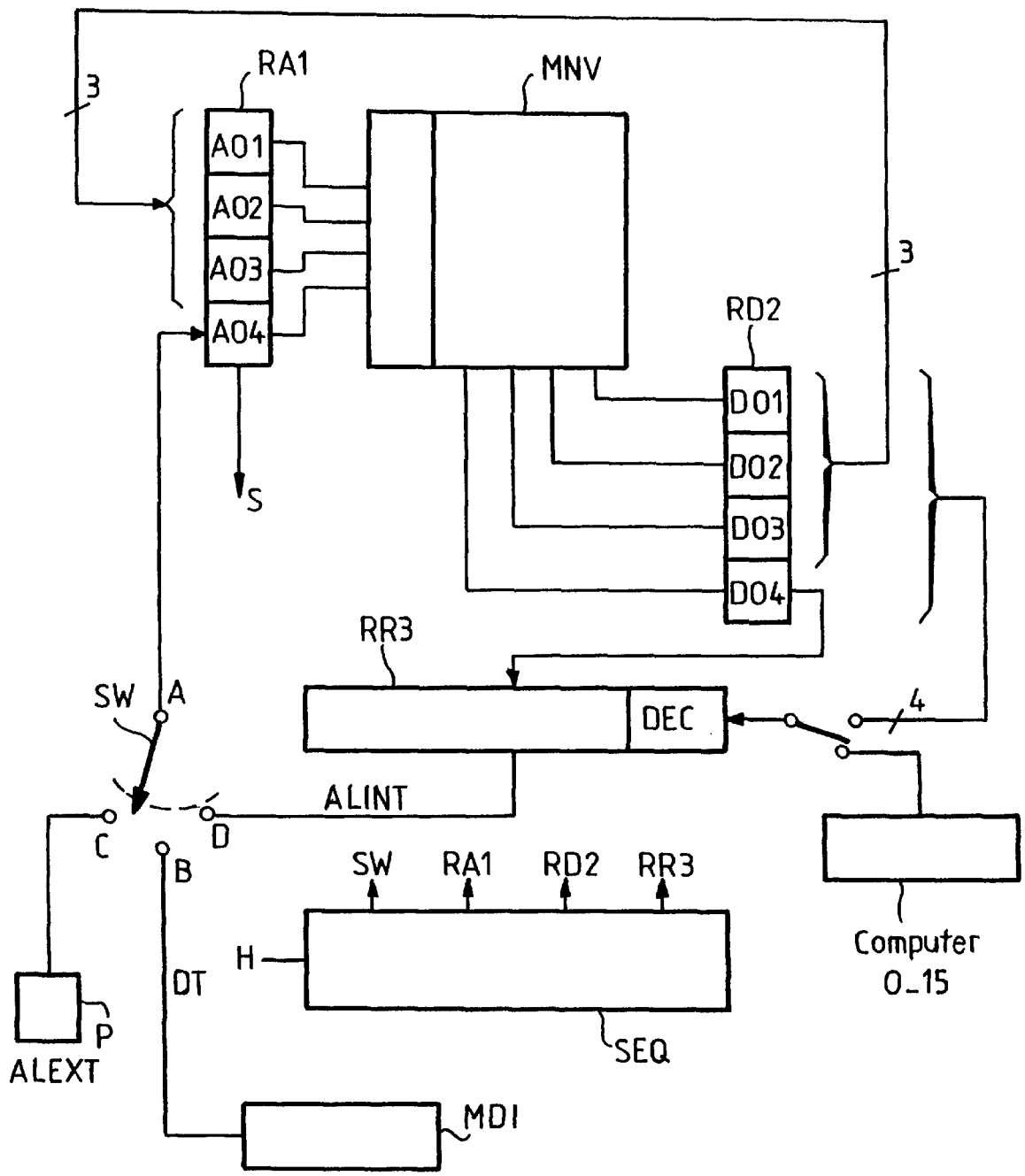
FIG_1

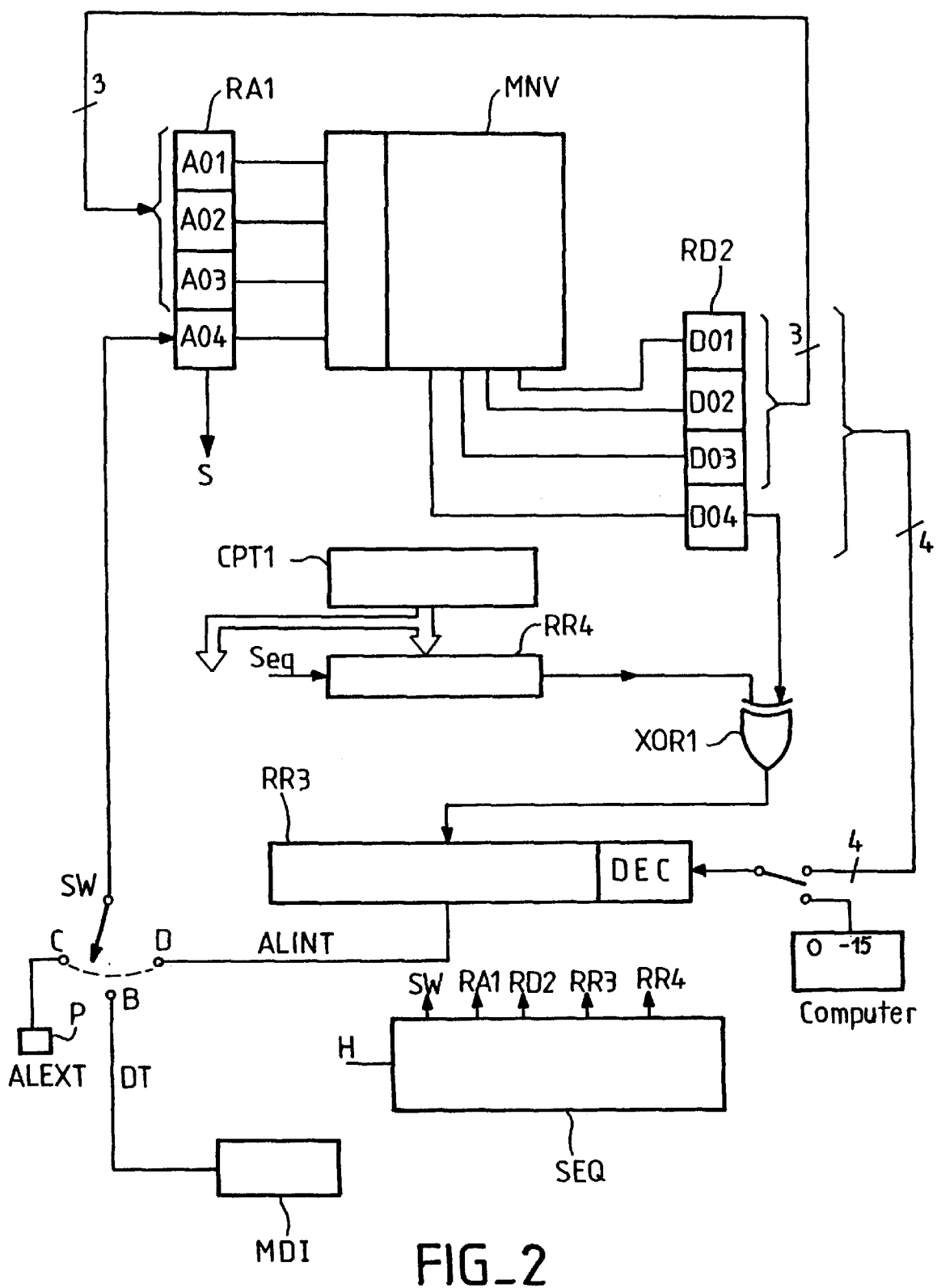
FIG_2

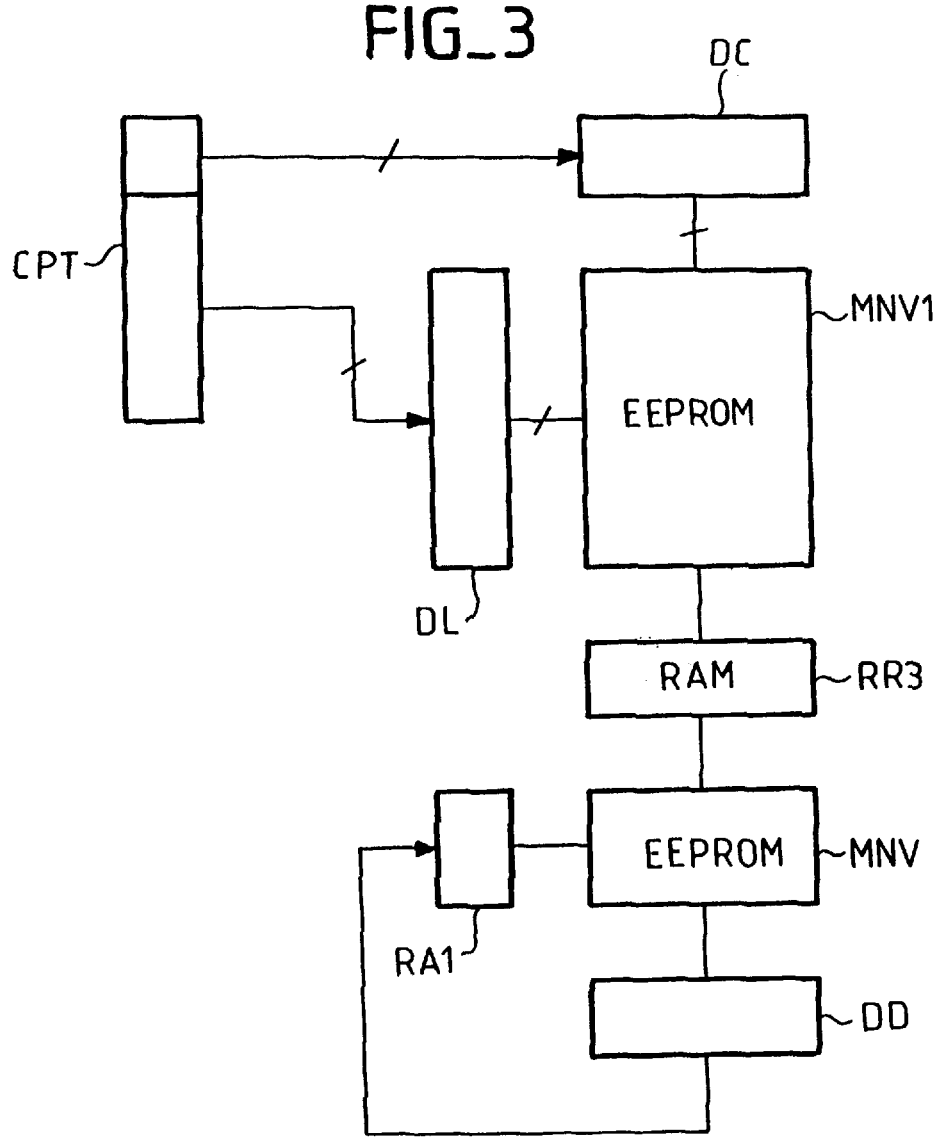

ENCRYPTION AND AUTHENTICATION METHOD AND CIRCUIT FOR SYNCHRONOUS SMART CARD

BACKGROUND OF THE INVENTION

Present-day chip cards may be divided into two broad categories: synchronous cards that use wired logic and have their operation controlled by an external clock signal; the clock signal is given by a card reader into which the card is inserted; and asynchronous cards that comprise a microprocessor and have an internal operation that is broadly independent of the reader.

Microprocessor cards enable numerous applications since the working of the card depends solely on the programs that will be incorporated into the card. These programs may be highly variable, depending on the application envisaged. On the contrary, synchronous cards are designed, in principle, for only one application.

A typical example of a synchronous cards is a prepaid phonecard that can be used to consume a certain number of phone-call time units, paid for in advance when the card is purchased. The main functions of the wired logic of the card are the reception of pulses coming from the reader and representing the units consumed, the programming of successive memory cells from these pulses and the transmission, to the reader, of information on the balance available.

Examples of microprocessor cards are access cards to reserved places, bank cards etc. and, more generally, cards used in many applications where the security of information plays a important role. This security is then governed by specific programs incorporated into the card.

The security of use of the card is notably provided by programs to authenticate the bearer, namely programs ascertaining that the bearer of the card is really authorized to use it or, again, programs to authenticate the card, namely programs ascertaining that the card is a genuine card and not a fraudulently manufactured or fraudulently modified card.

Cryptographic programs are provided in the microprocessor cards to carry out these functions of authentication, but this is not so for synchronous cards. Indeed, the reason why synchronous cards continue to be used, even though by construction they offer far fewer possibilities than microprocessor cards, is that they are far less costly: their simple wired logic takes up a far smaller surface area of silicon than a microprocessor and its peripherals. However, if a synchronous card has to be provided with cryptographic computation functions similar to those used in microprocessors, the cost increase would obviate the value of these cards.

However, it is becoming increasingly necessary to plan for security against fraudulent activity even with respect to synchronous cards. Indeed, precautions need to be taken against two possibilities: firstly the fraudulent simulation of a genuine chip card by a dummy or by a personal microcomputer connected to the card reader; the dummy or the microcomputer gives signals that are expected by the reader and lets the reader believe that it is in the presence of a genuine card and secondly, precautions must be taken against the manufacture of spurious cards which are, in all respects, identical to the genuine ones.

SUMMARY OF THE INVENTION

The invention proposes the making of synchronous cards comprising wired logic means that are very simple and inexpensive but, at the same time, highly efficient in order to carry out functions of authentication guaranteeing the right to use the card.

In its general principle, the invention uses a procedure similar to the one used for microprocessor cards: the reader, for example, sends the card a random binary code. The card carries out an internal computation on the basis of this code and of secret data that it contains in its memory. The result is sent to the reader which, for its part, has carried out the same computation on the basis of, the same data elements (the reader knows the secret data elements of the card, or at least it is able to reconstitute them), and the results are compared in the reader to authenticate the card and hence validate its use.

However, what gives the invention its specific character is the fact that the computation made by the card is not a true mathematical type of computation, for this would require excessively complex cards. Rather it is a method of encryption with recursive phases using a non-volatile secret data memory. The method comprises the recursive performance of the following cycle: the reading of a word in the secret data memory, this word being located at an address that is determined at least partly by the contents of the word read at the previous cycle. Thus, the contents of the memory at a determined address can be used, in combination with other logic data elements, to define a following address to find new contents in the memory. The cycles of these recursive phases are repeated for a number of times that is sufficient to ensure efficient encryption. The contents of the data memory are secret and cannot be transmitted to the external terminals of the integrated circuit.

The method is particularly well suited to the authentication of a memory card. The card has its own table of secret data elements and a circuit that carries out the recursive phases on this table.

This notion of scrambling by recursive phases, wherein at each time an address is defined on the basis of a set of contents read at a previous address, can be used in many different ways.

In one example, the bits of a random code sent by the reader are mixed with the bits extracted from the memory at a determined address, to define a new address, and the words extracted from the memory in these recursive phases may be used to create a new random code, internal to the card. This internal random code is itself then used to obtain a result of encryption. This result too will preferably be obtained by a succession of recursive phases implementing the same principle of address determination on the basis of the word read at the preceding address. It is then possible, for example, at each cycle, to define a new address from certain bits of the word read at the previous address, and from certain bits of the internal random code.

The final result of the encryption procedure implementing the invention is defined by a succession of bits obtained during one or more determined phases of the procedure (all the bits may be obtained during one and the same cycle of the recursive phase, or else each group of bits of the succession may be obtained during a respective cycle). This encryption result appears for example in a register at the end of the procedure or, again, it is constituted by a succession of bits, each sent during a respective cycle at the end of the procedure: for example, a result bit sent during each of the last four cycles of a succession of 48 cycles.

The result is sent to the card reader which has made its own computation on the basis of the same data and can verify the accuracy of the awaited result.

It will be seen that this non-mathematical encryption procedure can be implemented with very simple logic circuits, which means that it is very valuable for synchronous type memory cards.

In a very simple preferred embodiment, the following recursive phase is provided for: at least one bit of the non-volatile memory comes from an internal data element of the card (for example the serial number or any other data element for the identification of the card), and the other address bits come from a word read in the memory at the previous address.

In another embodiment which, furthermore, can be used at the same time as the first one, the following recursive phase is provided for: at least one address bit comes from an external data element (preferably a random code), transmitted by the reader and the other address bits come from a word read in the memory at the previous address.

In yet another embodiment that can be used at the same time as the foregoing embodiments, the following recursive phase is provided for: at least one address bit comes from a register of a random code internal to the card and the other address bits come from a word read in the memory at the previous address. The internal random code bit may then be selected by a register address, this address being also defined, at least partly, from all or a part of the word read in the memory at the previous address.

The internal random code can itself be created by a recursive phase of the type indicated here above, from an external random code transmitted by the reader. For example, the internal code is constituted by the succession of bits obtained during different cycles as follows: taking a bit of the word that is read each time in the memory when the address of this word is itself defined in part by the previous word and by a bit of the external random code.

It must be noted that, apart from encryption by recursion using a memory of secret data elements, a major aspect of the invention consists in the creation, the storage and then the use of an internal random code from the external random code, so that the external random code does not have to be stored or used directly when the result is created. It is then the internal code that undergoes the recursive encryption procedure by means of the memory of secret data elements.

The invention also relates to an encryption circuit, notably to protect a chip card against fraudulent use, this circuit comprising a memory of secret data elements, an address register to contain a word address of the memory, a data register to receive and temporarily store the word read in the memory at the address indicated by the address register, means for the placing, in the address register, of at least a part of the word contained in the data register, and means to carry out successive readings of the memory at the addresses successively obtained in the address register.

The circuit also preferably comprises one or more of the following means: means for the introduction, into the address register, of at least one bit coming from a non-volatile memory zone of the card, means for the introduction, into the address register, of at least one bit coming from the card reader (should the circuit be incorporated into a card), means for the introduction, into the address register, of at least one bit coming from an internal volatile register of the card and, finally, means for the placing, in a volatile register, of the bits coming from the data register, these bits being obtained during successive readings of the memory of secret data elements.

The memory which contains the table of secret data elements is preferably a non-volatile EEPROM and, in this case, there is provision for addressing it not only according to the algorithm described but also simply by an address counter during the customizing phase in which the data table is written into the memory.

In short, the invention relates first of all to a method for the encryption of information by means of a secret key, characterized in that it comprises the recursive execution of the following cycle: the reading of a word in a memory of secret data elements, this word being located at an address at least partly determined by the contents of the word read at the previous cycle. The invention then relates to various uses of this method as defined in the claims.

The invention then relates to an encryption circuit and a chip card provided with means of security against fraud as indicated here above.

In addition, the invention relates to a method for the operation of a chip card, in an authentication procedure that consists in receiving an external random element, performing an encryption operation on the basis of this random element and of data elements internal to the card and sending back an encryption result, characterized in that an internal random element is created and stored in the card on the basis of an encryption procedure using the external random element without storage of the external random element in the card. Preferably, the result of the encryption is then obtained by another encryption procedure using the internal random element. The creation of the internal random element can be done by the non-mathematical recursive encryption algorithm indicated here above. The invention also relates to a chip card comprising means to create an internal random element as and when it arrives without storage of the external random element.

Finally, according to an additional characteristic, the invention proposes, in the encryption and authentication methods defined here above, to bring into play, in the encryption, a data element that varies with each new use of the card, preferably the contents of a non-volatile operations counter contained in the card, this counter being incremented at each new use of the card. In the case of a conversion of an external random element into an internal random element, the card will comprise means for the conversion of the external random element into an internal random element without storage of the external random element, and preferably an operations counter.

The invention is especially applicable to synchronous type cards that use a wired logic and whose operation is controlled by an external clock signal.

The authentication procedures to which the invention can be applied may be procedures to authenticate the bearer (authorized bearer) or the card itself (valid card).

BRIEF DESCRIPTION OF THE DRAWING

Other features and advantages of the invention shall appear from the reading of the following detailed description, made with reference to the appended drawings, of which:

FIG. 1 shows the basic circuit with which the method according to the invention can be implemented;

FIG. 2 shows a variant of the making of the circuit according to FIG. 1;

FIG. 3 shows a general architecture of an integrated circuit enabling the implementation of the invention.

DETAILED DESCRIPTION OF THE PREFERRED EMBODIMENT

The circuit shown in FIG. 1 is contained in a synchronous memory card whose main function, whether prepayment or any other function, is not shown since this main function is independent of the security functions with which the invention is concerned.

Nor shall the constitution of the card reader be dealt with. The card reader should be capable of carrying out the same procedure as the card to determine a result from a random binary code. However, the reader may quite possibly use circuits different from those of the card to carry out this computation. In particular, the reader may use a microprocessor to simulate the wired logic operations of the card by software. Furthermore, the reader should preferably be capable of sending the card a random code. This is a standard operation with respect to card security and does not need to be described.

One input of the security circuit is constituted by a terminal C by which it is possible precisely to introduce the random code sent by the reader which shall be called an external random code ALEXT. The input C may be connected, for this purpose, to an access pad P of the card.

For synchronous cards, the communication with the reader is most usually done by binary data elements in series, i.e. the bits appear successively at the input C, in synchronism with the clock signals H sent by the reader and received by the card.

The terminal C is connected by a change-over switch SW to a terminal A. The change-over switch can connect the terminal A to one of the three different terminals, namely:

the terminal C which can receive the external random code ALEXT;

a terminal B which can receive internal data elements of the card, for example a data element DT representing the serial number of the card, contained in an internal memory of the card;

a terminal D that can receive the bits from an internal random element ALINT: we shall see how this internal random element ALINT is obtained, during the recursive procedure, from the external random element.

The authentication circuit comprises: a first register RA1 to contain memory addresses; a non-volatile memory MNV with its decoding and reading means, the memory being capable of receiving, as an address, the contents of the register RA1; a second register RD2 that may contain the data elements read in the memory. Depending on the practical embodiment used, the registers RA1 and RD2 may be either distinct units or one and the same unit. For the simplicity of the explanation, they are shown as being distinct. Finally, the authentication circuit has a third register RR3 that contains data elements extracted from those read in the memory and can restore bits (notably to the terminal D) selected in a way that shall be described further below.

The register R3 has decoding means (DEC) to select these bits. It is therefore an addressable register that is consequently similar to a memory but may be volatile since the data elements that it contains are used only during an authentication sequence.

A sequencer SEQ activates the different circuits (switch, memories and registers) described here above in a pre-set sequence that is synchronized by the external clock signal H received from the card reader.

The contents of the non-volatile memory MNV are not accessible at the external terminals of the card. They are therefore secret contents analogous to a secret encryption key since it is these contents that will define the encryption in the procedure according to the invention. However, these contents are known by the card reader since this reader has to carry out exactly the same encryption procedure. This notion of a secret key and of an encryption function is used herein by analogy with the authentication functions used in microprocessor-based cards. In these cards, a mathematical function of encryption F enables the computation of a result R from one or more data elements (these are, conventionally, the external random element ALEXT, internal data elements DT of the card and a secret key K that is stored in the card and cannot be read at the external terminals of the card): R=F(ALEXT, DT, K).

However, here there is no mathematical function F but rather a preparation of the result by a recursive procedure bringing the addresses and the data elements of the memory into play.

The external random element and the internal data elements of the card come into play in the recursive procedure for determining a new address, in the sense that the new address comprises partly the bits read at the previous address and partly bits of the external random element or bits of the internal data elements of the card.

The invention shall be described in relation to a memory of sixteen 4-bit words in order to simplify the explanation, but it is clear that the invention is not restricted to this choice.

The register RA1 is a 4-bit register containing the address that shall be applied to the memory. The address bits are designated by $A01$ to $A03$ respectively. The register RD2 is a 4-bit register containing the word that has just been read in the memory. The data bits are designated by $D01$ to $D03$ respectively.

The register RR3 is designed to contain the internal random element constituted as and when the external random element arrives in order to enable the storage of a random element during a part of the authentication procedure without the random element received from the card reader for this procedure being itself stored in the chip card. The register RR3 is filled with successive bits arriving at each recursion cycle and created from successive bits of the external random element.

The authentication sequence preferably takes place as follows, in three major steps, with a phase of recursive cycles at each step: these three major steps are an initialization step using a serial number of the card, a step for constituting an internal random code from an external random code sent by the reader and a step for constituting an encryption result from the internal random code. However, the invention is not restricted to this example.

I. Initialization

I.1 At the time of resetting at zero (activated by the reader) the address register RA1 is reset at zero.

I.2 The change-over switch SW is placed in the position B (reception of an internal data element DT coming from the card, this internal data element DT possibly being, for example, a serial number recorded in a non-volatile way in the card).

I.3 A bit of the internal data element DT (initially the first bit) is placed in the fourth slot A04 of the address register RA1.

I.4 The contents of the memory at the address then defined by the register RA1 are placed in the data register RD2.

I.5 The three bits of the slots D0, D02, D03 of the register RD2 are placed in the slots A01, A02, A03 of the register RA1.

I.6 A recursive phase is then carried out: the steps I.3 to I.5 are repeated at each stroke of the clock: the second bit of the internal data element and then the third bit, etc. fill the slot A04 of the register A1 and, in combination with the three bits of data elements read each time in the preceding address, recursively constitute a new address for the non-volatile memory.

The step I.6 lasts for as many clock stocks as there are bits in the internal data element. This number is predefined and the sequencer SEQ is built as a function of this number.

II. Use of the External Random Element

The external random code will be used to create an internal random code by the following algorithm:

II.1 The change-over switch SW is placed in the position C where it can receive the external random code ALEXT from the card reader. The bits of this random element arrive successively at each clock stroke.

II.2 One bit of the external random element (initially the first bit) is placed in the fourth slot A04 of the address register RA1;

II.3 The contents of the address memory then defined by the register RA1 are placed in the data element RD2.

II.4 The three bits of the slots D01, D02, D03 of the register RD2 are placed in the slots A01, A02, A03 of the register RA1.

II.5 The contents of the slot D04 are sent to the first slot of the register RR3 which will then start containing a random data element since this data element depends on the external random element.

II.6 The steps II.2 to II.5 are repeated at each clock stroke for as long as the transmission of the external random element lasts, for example 16 clock strokes for a 16-bit random element. The slots of the register RR3 get filled successively at the step II.5 and an internal random element ALINT stored in the register RR3 is arrived at. The external random element has not been stored in the card during this procedure. The internal random element has been created bit by bit, as and when the bits of the external random element have arrived.

III.1 Use of the Internal Random Element

The internal random element thus created will now be used to create a result of the authentication algorithm.

III.1 The switch is now switched over to the position D where it can receive the bits of the internal random element stored in the register RR3. In the preferred example explained herein, the register RR3 is constituted as a memory of 1-bit words, this memory being addressable. The output of the memory is connected to the node D to be connected during this phase to the slot A04 of the address register RA1. The bits of the internal random element will not be transmitted successively in the order in which they are recorded but in an order obtained (here again) by a recursive procedure bringing the addresses and the data elements of the memory into play.

III.2 The word contained in the data register RD2 is used as an address of the register R3, by means of the decoder DEC associated with this register. The bit read at the address thus indicated is transmitted to the slot A04 of the register RA1. Simultaneously, the first three bits D01, D02, D03 of the word read in the register RD2 are placed in the slots A01 to A03 of the address register RA1.

III.3 The word read in the memory at the address now contained in the address register RA1 is placed in the data register RD2.

III.4 The steps III.2 and III.3 are repeated for a fixed number of times, for example 48 times.

IV. Result

The result can be taken from one of the registers, preferably the address register RA1 which is the one most easily connected to the exterior. This result is sent to the reader which has performed the same algorithm for itself. The equality of the results indicates that the card is genuine.

In the example described, the result may be simply the contents of the address register RA1 at the last step III.5 of the last cycle of the recursive phase III. However, it is clearly possible to conceive of variants such as the transmission of a bit of a register (preferably RA1 or RD2) in the course of a cycle, then the transmission of another bit at a following cycle, etc.

A description has thus been given of the preferred algorithm according to the invention, for the obtaining of an authentication result. The most valuable points of this preferred algorithm include the following particular features:

the use of recursive procedures enabling the constitution of a memory address from, firstly, the secret contents of the memory at a previous address and, secondly, other data elements; and the constitution of an internal random element from an external random element and from the secret contents of the memory, then the use of this internal random element and not the external random element, so that it would be of no avail for a fraudulent person to try and read the random element sent by the reader.

Naturally, variants and steps of greater complexity may be envisaged. For example, provision can be made for the register RR3 to be filled during the initialization step, for example with a succession of bits drawn from the slot A04 during recursive phases of the initialization step. The contents of the register RR3 may then be emptied, at a rate of one bit per phase, during recursive phases of the step for using the external random element, in a slot of the register RA1, for example the slot A03.

Another example of a modification consists in addressing the register RR3, during the phase for the creation of the internal random element, by the address of the word in progress or by a modified address (for example incremented by one unit).

A description shall now be given, with reference to FIG. 2, of an improvement according to the invention. In this improvement, to increase security against fraud, it is proposed to use a data element, modified at each new use of the card, in the encryption algorithm. This data element may be put to use within the recursive cycle constituting the encryption algorithm, either to modify the address of a new word each time or to modify a result bit of the encryption.

A description shall be given of a particular example of use of this variable data element at each new use of the card, should the variable data element be used to modify a result bit of the encryption. In this case, it is not obligatory for the encryption to be done by recursive cycles for the addressing of a data table, but nevertheless a description shall be given of the exemplary embodiment with such a cycle.

FIG. 2 is, in this case, similar to FIG. 1, with the following modifications: the slot D04 of the register RD2 is not directly linked to the register RR3 but an additional circuit is inserted between the slot D04 and the register RR3. This circuit has an Exclusive-OR gate XOR1, a register RR4 and a counter CPT1.

The register RR3 is furthermore designed to contain the internal random element as and when the external random element arrives in order to enable the storage of a random element during a part of the authentication procedure without the received random element being itself stored in the chip card. The register RR3 is filled with successive bits arriving at each recursive cycle from the output of an Exclusive-OR gate XOR1, one input of which comes from the slot D04 of the register RD2 and the other input of which comes from the series output of a shift register RR4 with parallel inputs containing initially the contents of a non-volatile operations counter CPT1. The operations counter is incremented or in any case modified at each new use of the card. For a telephone card, provision may be made, for example, for the counter to be incremented at each use giving rise to the consumption of prepaid units, or even at each consumption of a unit.

The shifting of the shift register RR4 may be synchronized with the recursive cycles of the encryption so as to move forward by one bit at each new cycle. The register RR4 is, for this purpose, controlled by the sequencer SEQ. The contents of the counter CPT1 are shed into the shift register RR4 at the time of the initializatio of the circuit, at each new use.

The output of the Exclusive-OR gate XOR1 is therefore a bit that is a combination of the bit D04 of the register RD2 at a given cycle and of one of the bits representing the contents of the operations counter. It will be seen that this arrangement enables the creation of the internal random element to be done according to a procedure that depends on a variable data element of the card (the state of the operations counter), it being possible however for this variable data element to be read by the card reader (this is the case, in principle, for the operations counter, when this counter counts a number of uses of the card as well as when it counts a number of already consumed prepayment units). In the example described, it has been assumed that a simple Exclusive-OR gate enables the introduction, into the encryption procedure, of the variable contents of the counter CPT1. But of course different functions, possibly of greater complexity, may be used to combine the contents of the counter CPT1 with other elements of the encryption procedure.

The modifications of the authentication sequence described here above are then the following:

During the operation I.1 of the initialization step, the shift register RR4 receives the contents of the operations counter CPT1.

During the step of use of the external random element, at the step II.5, the contents of the slot D04 are processed in the gate XOR1 with a corresponding bit of the register RR4; the result is sent into the first slot of the register RR3 which will thereupon start containing a random data element since this data element depends on the external random element. The procedure depends on the state of the operations counter by means of the counter CPT1, the shift register RR4 and the gate XOR1. It will be noted that the card reader may gain access to the contents of this counter to take account of the state of the counter in its own computation of the encryption result. The shift register RR4 is then shifted by one unit for the following cycle.

FIG. 3 shows a general architecture of a memory card circuit that can be used to implement the authentication algorithm described, with the least possible divergence from the usual architectures of memory cards. Thus, the invention could be implemented with a minimum consumption of chip surface area, limiting the extra cost related to security.

The integrated circuit is organized around a main non-volatile memory MNV1 that contains data necessary for the normal working of the memory card. It also contains the above-mentioned data elements DT (serial number of the card for example). This memory MNV1 is provided with standard line decoding means (DL) and column decoding means (DC). In the example shown, it is a memory organized in 16-bit words. An address counter CPT is used to define the successive addresses of the words of the memory: the less significant values define the columnwise addresses and the more significant values define the linewise addresses. The entire circuit works in sequential bit-by-bit transmission. The counter must therefore be incremented sixteen times to explore the sixteen columns of the memory before changing lines.

Another portion of non-volatile memory is shown separately from the memory MNV1. This is the memory MNV that contains the secret encryption table proper to the card. This memory portion is inaccessible, except during the customizing of the card, i.e. during the writing of secret data elements proper to the card. There are known ways of making memory portions such as these, which are then made inaccessible (after customizing) by the blowing of fuses.

This inaccessible memory portion MNV is addressed by an address register (four bits in the example) which will get filled at each clock stroke H partially by data elements coming from the memory MNV and partially by other data elements. This is the equivalent of the address register RA1 of FIG. 1. The equivalent of the register RD2 is not shown in FIG. 2. It may be an integral part of the memory MNV.

A 16-bit RAM register is furthermore provided in order to store bits coming from the memory MNV, this register being accessible by a decoder which may be precisely the column decoder DC of the memory MNV1. This register is the equivalent of the register RR3 of FIG. 1, which will contain the internal random element generated from bits of the memory MNV.

Finally, since the memory is organized into 16-bit words, a column decoder DD is placed at output of the secret memory MNV. This decoder has a twofold function: firstly the selecting, in the memory MNV, of a word of 4 bits among 16 bits to place a part thereof in the address register RA1 and, secondly, the selecting of one bit among 16 bits in the RAM register to place it also in the address register.

This general memory organization is given purely as an indication to show how to make the algorithm of the invention compatible with the existing architectures.

Another valuable aspect of the invention lies in the possibility of making the card itself check an encryption result given by the card reader: the card and the reader perform the same algorithm and provision can be made for the reader to send a bit regularly during the phase when the card uses and encrypts the internal random element. Indeed, at this particular time, the reader is free to transmit data elements. It is possible to provide, for example, for the following check: at a given instant, a determined bit of the secret table MNV appears at an output of this table. The reader, who carries out the procedure simultaneously, then sends the card the same bit. The card compares the received bits with the computed bits and it may be the case that it validates its own operation only if the succession of results during the recursive phases is accurate.

The card then has a means to compare a bit coming from an output of the memory MNV with a bit sent by the reader in synchronism.

This particular feature is advantageous, for example when rechargeable, prepayment cards are to be made: the recharging will be done (by erasure of all the bits of a memory that are reserved for a credit of units) only if the reader sends the succession of bits corresponding to a correct encryption sequence. It is therefore the card that checks the reader at the same time as the reader checks the card.

We claim:

1. A method of encrypting information with a secret key, comprising the recursive performance of the following steps:

A. reading a word in a secret data memory;

B. determining an address, the address being determined at least partially by the contents of the word;

wherein, during each subsequent repetition of step (A), the next word is read at the address determined during a previous performance of step (B).

2. A method according to claim 1, wherein the secret data memory is contained in a memory card, and further comprising the steps of introducing the memory card into a card reader, and authenticating the memory card based on the recursive performance of steps (A) and (B).

3. A method according to claim 2, wherein, during step (B), the address is also partially determined by at least one bit of a data element which identifies the memory card and which is stored in the memory card.

4. A method according to claim 2, wherein, during step (B), the address is also partially determined by at least one bit of an external data element transmitted by the card reader to the memory card.

5. A method according to claim 4, wherein the external data element transmitted by the card reader is an external random data element.

6. A method according to claim 5, further comprising the steps of creating an internal random data element based on the words read during successive repetitions of step (A), and storing the internal random data element in an internal register of the memory card.

7. A method according to claim 6, wherein there are a plurality of phases of the recursive performance of steps (A) and (B), wherein the address is partially determined during step (B) by the at least one bit of the external random data element during a first phase, and wherein, during a second phase, the address is partially determined during step (B) by at least one bit of the internal random data element.

8. A method according to claim 7, wherein the internal register is addressable, and wherein, during the second phase, an address applied to the internal register is constituted on the basis of the word read in the secret data memory during the previous performance of step (A).

9. A method according to claim 2, further comprising the steps of sending an external random data element from the card reader to the memory card, generating an internal random data element from the external random data element, the generating step being performed by the card, authenticating the memory card using the internal random data element, the memory card being authenticated by encrypting the internal random data element using the words contained in the secret data memory.

10. A method according to claim 1, wherein the encryption is used for authenticating a chip card, the chip card being introduced into a card reader, and further comprising the steps of sending a random data element from the card reader to the chip card, and sending an encryption result from the chip card to the card reader, the encryption result being constituted from bits of the words read during certain of the repetitions of step (A).

11. A method according to claim 1, wherein, during step (B), a data element is utilized which varies with each new use of the memory card.

12. A chip card comprising:

an encryption circuit, the encryption circuit providing the chip card with security against fraud, the encryption circuit further including a secret data memory, the secret data memory serving as an encryption key, an address register, the address register containing an address of a word of the secret data memory, a data register, the data register receiving and temporarily storing the word read at the address contained in the address register, means for placing, in the address register, at least a part of the word stored in the data register, thereby enabling the secret data memory to serve as the encryption key, and means for carrying out successive readings of the secret data memory at addresses successively contained in the address register.

13. A chip card according to claim 12, further comprising means for transmitting an encryption result to the exterior of the card, the encryption result being constituted by a succession of bits taken from the data register during certain of the successive readings of the secret data memory.

14. A chip card according to claim 13, further comprising means for placing, in the address register, at least one bit that comes from a source other than the word stored in the data register.

15. A chip card according to claim 14, wherein the at least one bit comes from the card reader.

16. A chip card according to claim 14, wherein the at least one bit comes from a non-volatile memory of the chip card.

17. A chip card according to claim 14, wherein the at least one bit comes from a volatile register of the chip card.

18. A chip card according to claim 13, further comprising means for placing bits coming from the data register in a volatile register of the chip card, the bits coming from the data register being obtained during successive readings of the secret data memory.

19. A method of operating a chip card to perform an authentication procedure, the method comprising the steps of:

receiving an external random data element; and performing an encryption operation on the basis of the external random data element and of data elements internal to the chip card, including the steps of performing a first encryption procedure using the external random data element, the first encryption procedure creating an internal random data element, the external random data element being used in the first encryption procedure as the external random data element is received such that the internal random data element is created without all bits of the external random data element ever being simultaneously stored in the chip card, storing the internal random data element in the chip card, and performing a second encryption procedure using the internal random data element, the second encryption procedure creating an encryption result.

20. A method according to claim 19, wherein, during the first encryption procedure, a variable data element is used that varies with each new use of the chip card.

21. A method according to claim 20, further comprising the steps of forming the variable data element on the basis of the contents of a non-volatile operations counter, the non-volatile operations counter being contained in the chip card, and transmitting the contents of the non-volatile operations counter to the exterior of the chip card during the authentication procedure.

22. A method according to claim 21, wherein, the step of performing the first encryption procedure further comprises the steps of applying a recursive addressing procedure, the recursive addressing procedure utilizing a table of a secret non-volatile data, and combining the bits coming from the recursive addressing procedure with the contents of the non-volatile operations counter.

23. A method according to claim 22 wherein, during the combining step, the bits coming from the recursive addressing procedure are combined in an exclusive-or gate with the bits representing the contents of the non-volatile operations counter.

24. A method according to claim 23 wherein, during each cycle of the recursive addressing procedure, a bit coming from the recursive addressing procedure is combined with a respective bit of the contents of the non-volatile operations counter.

25. A chip card which receives an external random data element during an authentication procedure, the chip card comprising:

a non-volatile operations counter having contents that are modified at each new use of the chip card, means for converting the external random data element into an internal random data element, the external random data element being converted as the external random data element is received such that the external random data element is converted without all bits of the external random data element ever being simultaneously stored in the chip card, and means for performing the authentication procedure using the internal random data element.

26. A chip card according to claim 25, wherein the means for converting uses the contents of the non-volatile operations counter to vary the conversion from one use to another of the card.

27. A chip card according to claim 26, wherein the means for converting further comprises a shift register with parallel inputs and a series output receiving the contents of the non-volatile operations counter during each new use of the chip card, and means for combining an output bit of the shift register with a bit coming from a procedure for the recursive addressing of a non-volatile memory, the shift register being shifted at each cycle of the recursive addressing procedure.

* * * * *